(12) United States Patent
Li et al.

(10) Patent No.: US 11,995,890 B2
(45) Date of Patent: May 28, 2024

(54) METHOD AND APPARATUS FOR TENSOR PROCESSING

(71) Applicant: HUAWEI TECHNOLOGIES CO., LTD., Guangdong (CN)

(72) Inventors: Chong Li, Boulogne Billancourt (FR); Zhen Zhang, Boulogne Billancourt (FR); Kun Mao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 302 days.

(21) Appl. No.: 17/338,218

(22) Filed: Jun. 3, 2021

(65) Prior Publication Data

US 2021/0294852 A1 Sep. 23, 2021

Related U.S. Application Data

(63) Continuation of application No. PCT/CN2019/122979, filed on Dec. 4, 2019.

(30) Foreign Application Priority Data

Dec. 6, 2018 (CN) .......................... 201811489176.2

(51) Int. Cl.
*G06F 7/00* (2006.01)
*G06F 3/06* (2006.01)
(Continued)

(52) U.S. Cl.
CPC ............ *G06V 20/46* (2022.01); *G06F 3/0604* (2013.01); *G06F 3/064* (2013.01); *G06F 3/0673* (2013.01);
(Continued)

(58) Field of Classification Search
CPC ............ G06F 16/9032; G06F 16/9017; G06F 3/0604; G06F 3/064; G06V 20/46; G06V 10/50; G06V 10/94; G06V 10/28
See application file for complete search history.

(56) References Cited

U.S. PATENT DOCUMENTS 5,473,748 A * 12/1995 Date .................. H04N 1/46
345/536
5,956,431 A * 9/1999 Iourcha ................ G06T 9/005
382/253
(Continued)

FOREIGN PATENT DOCUMENTS

CN 104166538 A 11/2014
CN 106023098 A 10/2016
(Continued)

OTHER PUBLICATIONS

Baoyuan Liu et al., Sparse Convolutional Neural Networks, Amazon 2015, 10 pages.
(Continued)

*Primary Examiner* — Mohammed R Uddin
(74) *Attorney, Agent, or Firm* — WOMBLE BOND DICKINSON (US) LLP

(57) ABSTRACT

A data processing method and apparatus are described. The data processing apparatus obtains an input tensor corresponding to input data. The data processing apparatus determines $M_1$ first-type tensor blocks and $M_2$ second-type tensor blocks. P processing units in the data processing apparatus process the M tensor blocks concurrently. In a first time period, all of the tensor blocks that are processed concurrently by the P processing units are first-type tensor blocks. In a second time period, all of the tensor blocks that are processed concurrently by the P processing units are second-type tensor blocks.

20 Claims, 8 Drawing Sheets

(51) Int. Cl.
*G06F 16/901* (2019.01)
*G06V 10/50* (2022.01)
*G06V 10/94* (2022.01)
*G06V 20/40* (2022.01)
*G06V 10/28* (2022.01)

(52) U.S. Cl.
CPC ......... *G06F 16/9017* (2019.01); *G06V 10/50* (2022.01); *G06V 10/94* (2022.01); *G06V 10/28* (2022.01)

(56) References Cited

U.S. PATENT DOCUMENTS

| | | | | |
|---|---|---|---|---|
| 8,442,821 | B1* | 5/2013 | Vanhoucke | G10L 15/14 704/232 |
| 9,497,380 | B1* | 11/2016 | Jannard | H04N 23/90 |
| 9,836,691 | B1* | 12/2017 | Narayanaswami | G06N 3/063 |
| 11,086,968 | B1* | 8/2021 | Baskaran | G06F 16/1744 |
| 11,531,902 | B2* | 12/2022 | Horesh | G06N 3/126 |
| 2003/0053706 | A1* | 3/2003 | Hong | H04N 19/186 382/253 |
| 2004/0151381 | A1* | 8/2004 | Porter | G06V 10/507 382/218 |
| 2011/0055379 | A1* | 3/2011 | Lin | G06F 18/2323 703/2 |
| 2012/0114226 | A1* | 5/2012 | Kameyama | G06V 40/16 382/155 |
| 2014/0181171 | A1* | 6/2014 | Dourbal | G06F 17/16 708/607 |
| 2015/0169369 | A1* | 6/2015 | Baskaran | G06F 9/4881 718/102 |
| 2015/0206026 | A1* | 7/2015 | Kim | G06V 10/50 382/170 |
| 2017/0220352 | A1* | 8/2017 | Woo | G06F 9/30054 |
| 2017/0316311 | A1 | 11/2017 | Pilly et al. | |
| 2017/0316312 | A1* | 11/2017 | Goyal | G06F 17/16 |
| 2018/0204117 | A1* | 7/2018 | Brevdo | G06N 3/044 |
| 2019/0392297 | A1* | 12/2019 | Lau | G06F 17/16 |
| 2020/0104126 | A1* | 4/2020 | Pearce | G06F 17/16 |
| 2020/0117981 | A1* | 4/2020 | Arthur | G06N 3/048 |
| 2020/0160226 | A1* | 5/2020 | Ross | G06F 7/5443 |
| 2020/0175095 | A1* | 6/2020 | Morariu | G06N 3/045 |
| 2023/0190158 | A1* | 6/2023 | Howard | A61B 5/1114 600/301 |
| 2023/0205489 | A1* | 6/2023 | Drane | G06F 7/483 708/501 |
| 2023/0214922 | A1* | 7/2023 | Lee | G06Q 40/04 705/37 |
| 2023/0217028 | A1* | 7/2023 | Zhang | H04N 19/30 375/240.02 |

FOREIGN PATENT DOCUMENTS

| | | |
|---|---|---|
| CN | 106203321 A | 12/2016 |
| CN | 107015946 A | 8/2017 |
| CN | 107038018 A | 8/2017 |
| CN | 107169922 A | 9/2017 |
| CN | 107239824 A | 10/2017 |
| JP | 2016139391 A | 8/2016 |
| WO | 2015192812 A1 | 12/2015 |

OTHER PUBLICATIONS

Benjamin Graham et al., Submanifold Sparse Conv, Facebook , Jun. 2017, 10 pages.

Mengye Ren et al., Sparse Blocks Network for Fast Inference, Uber , Jun. 7, 2018, 10 pages.

Scott Gray et al., GPU Kernels for Block-Sparse Weights, OpenAI (2017), 12 pages.

Li Fanchang et al., "" Lie group machine learning ,Apr. 2013,total:5pages.

* cited by examiner

FIG. 3

| 0 | 0 | 1 | 1 | 1 | 1 | 1 | 1 | 1 | 0 | 0 | 0 |
|---|---|---|---|---|---|---|---|---|---|---|---|
| 0 | 1 | 1 | 1 | 1 | 1 | 1 | 1 | 1 | 1 | 0 | 0 |
| 1 | 1 | 1 | 1 | 0 | 0 | 0 | 1 | 1 | 1 | 1 | 0 |
| 1 | 1 | 1 | 0 | 0 | 0 | 0 | 0 | 1 | 1 | 1 | 0 |
| 1 | 1 | 1 | 0 | 0 | 0 | 0 | 0 | 0 | 1 | 1 | 0 |
| 1 | 1 | 1 | 0 | 0 | 0 | 0 | 0 | 0 | 1 | 1 | 0 |
| 1 | 1 | 1 | 0 | 0 | 0 | 0 | 0 | 0 | 1 | 1 | 0 |
| 1 | 1 | 1 | 1 | 0 | 0 | 0 | 0 | 1 | 1 | 1 | 0 |
| 0 | 1 | 1 | 1 | 1 | 1 | 1 | 1 | 1 | 1 | 1 | 0 |
| 0 | 0 | 1 | 1 | 1 | 1 | 1 | 1 | 1 | 1 | 0 | 0 |
| 0 | 0 | 0 | 0 | 1 | 1 | 1 | 1 | 0 | 0 | 0 | 0 |
| 0 | 0 | 0 | 0 | 0 | 0 | 0 | 0 | 0 | 0 | 0 | 0 |

| 0 | 0 | 1 | 2 | 3 | 4 | 5 | 6 | 7 | 7 | 7 | 7 |
|---|---|---|---|---|---|---|---|---|---|---|---|
| 7 | 8 | 9 | 10 | 11 | 12 | 13 | 14 | 15 | 16 | 16 | 16 |
| 17 | 18 | 19 | 20 | 20 | 20 | 20 | 21 | 22 | 23 | 24 | 24 |
| 25 | 26 | 27 | 27 | 27 | 27 | 27 | 27 | 28 | 29 | 30 | 30 |
| 31 | 32 | 33 | 33 | 33 | 33 | 33 | 33 | 33 | 34 | 35 | 35 |
| 36 | 37 | 38 | 38 | 38 | 38 | 38 | 38 | 38 | 39 | 40 | 40 |
| 41 | 42 | 43 | 43 | 43 | 43 | 43 | 43 | 43 | 44 | 45 | 45 |
| 46 | 47 | 48 | 49 | 49 | 49 | 49 | 49 | 50 | 51 | 52 | 52 |
| 52 | 53 | 54 | 55 | 56 | 57 | 58 | 59 | 60 | 61 | 62 | 62 |
| 62 | 62 | 63 | 64 | 65 | 66 | 67 | 68 | 69 | 70 | 70 | 70 |
| 70 | 70 | 70 | 70 | 71 | 72 | 73 | 74 | 74 | 74 | 74 | 74 |
| 74 | 74 | 74 | 74 | 74 | 74 | 74 | 74 | 74 | 74 | 74 | 74 |

FIG. 6

| 1 | 2 | 2 | 2 | 2 | 2 | 2 | 2 | 2 | 3 | 4 | 5 |
|---|---|---|---|---|---|---|---|---|---|---|---|
| 6 | 6 | 6 | 6 | 6 | 6 | 6 | 6 | 6 | 6 | 7 | 8 |
| 8 | 8 | 8 | 8 | 9 | 10 | 11 | 11 | 11 | 11 | 11 | 12 |
| 12 | 12 | 12 | 13 | 14 | 15 | 16 | 17 | 17 | 17 | 17 | 18 |
| 18 | 18 | 18 | 19 | 20 | 21 | 22 | 23 | 24 | 24 | 24 | 25 |
| 25 | 25 | 25 | 26 | 27 | 28 | 29 | 30 | 31 | 31 | 31 | 32 |
| 32 | 32 | 32 | 33 | 34 | 35 | 36 | 37 | 38 | 38 | 38 | 39 |
| 39 | 39 | 39 | 39 | 40 | 41 | 42 | 43 | 43 | 43 | 43 | 44 |
| 45 | 45 | 45 | 45 | 45 | 45 | 45 | 45 | 45 | 45 | 45 | 46 |
| 47 | 48 | 48 | 48 | 48 | 48 | 48 | 48 | 48 | 48 | 49 | 50 |
| 51 | 52 | 53 | 54 | 54 | 54 | 54 | 54 | 55 | 56 | 57 | 58 |
| 59 | 60 | 61 | 62 | 63 | 64 | 65 | 66 | 67 | 68 | 69 | 70 |

METHOD AND APPARATUS FOR TENSOR PROCESSING

CROSS-REFERENCE TO RELATED APPLICATIONS

This application is a continuation of International Application No. PCT/CN2019/122979, filed on Dec. 4, 2019, which claims priority to Chinese Patent Application No. 201811489176.2, filed on Dec. 6, 2018. The disclosures of the aforementioned applications are hereby incorporated by reference in their entireties.

TECHNICAL FIELD

This application relates to the field of information technologies, and more specifically, to a data processing method and a data processing apparatus.

BACKGROUND

Currently, a processor including a plurality of processing units may be used to process, for example, a tensor of video data. The tensor can be divided into a plurality of tensor blocks, and a plurality of processors process the plurality of tensor blocks in batches. For example, it is assumed that the tensor is divided into 60 tensor blocks, and the processor includes 20 processing units in total. The 20 processing units first process a first 20 tensor blocks, then process a $21^{st}$ to a $40^{th}$ tensor blocks, and finally process the $41^{st}$ to a $60^{th}$ tensor blocks. However, different tensor blocks may have different processing difficulties because the different tensor blocks include different elements. As a result, different processing units process the different tensor blocks at different speeds. A processing unit that first completes tensor block processing can continue to process a next batch of tensor blocks only after another processing unit completes processing. In this way, utilization efficiency of processing units is reduced, thereby decreasing a speed of processing the tensor.

SUMMARY

This application provides a data processing method and a data processing apparatus, to increase a data processing speed.

According to a first aspect, an embodiment of this application provides a data processing method. The method includes: A data processing apparatus obtains an input tensor corresponding to input data. The input tensor is an N-dimensional tensor, and N is a positive integer greater than or equal to 1. The input tensor consists of M tensor blocks, and M is a positive integer greater than or equal to 2. P processing units in the data processing apparatus process the M tensor blocks concurrently. In a first time period, all of the tensor blocks that are processed concurrently by the P processing units are first-type tensor blocks. The first-type tensor block is a tensor block whose tensor block attribute is a first attribute in the M tensor blocks. In a second time period, all of the tensor blocks that are processed concurrently by the P processing units are second-type tensor blocks. The second-type tensor block is a tensor block whose tensor block attribute is a second attribute in the M tensor blocks. The first time period does not overlap the second time period, and P is a positive integer greater than or equal to 2.

In the foregoing technical solution, the data processing apparatus determines tensor blocks with a same attribute from the M tensor blocks based on attributes of the tensor blocks, and the processing units in the data processing apparatus may process the tensor blocks with the same attribute concurrently based on the attributes of the tensor blocks. Processing difficulties of the tensor blocks with the same attributes are similar. Therefore, processing times vary slightly. Processing difficulties of tensor blocks with different attributes vary greatly. Therefore, processing times vary greatly. Therefore, in the foregoing technical solution, a parallel processing idle waiting time caused by mixing the tensor blocks with the different attributes can be effectively avoided, and a processing speed of the tensor is effectively increased, thereby increasing a speed of processing massive data by the data processing apparatus.

It should be noted that a sum of $M_1$ and $M_2$ is less than or equal to M. The M tensor blocks may be classified into two types or more types of tensor blocks based on different attributes, and the P processing units respectively process the plurality of types of tensor blocks concurrently in different time periods.

With reference to the first aspect, in a possible embodiment of the first aspect, before that P processing units in the data processing apparatus process the M tensor blocks concurrently, the method further includes: The data processing apparatus determines $M_1$ first tensor block indexes and $M_2$ second tensor block indexes. The $M_1$ first tensor block indexes are respectively used to indicate $M_1$ first-type tensor blocks, the $M_2$ second tensor block indexes are respectively used to indicate $M_2$ second-type tensor blocks, and $M_1$ and $M_2$ are positive integers greater than or equal to 1. The data processing apparatus saves the $M_1$ first tensor block indexes in first storage space, and saves the $M_2$ second tensor block indexes in second storage space. The P processing units obtain the $M_1$ first tensor block indexes from the first storage space, and obtain the $M_2$ second tensor block indexes from the second storage space. That the P processing units in the data processing apparatus process the M tensor blocks concurrently includes: The P processing units process the M tensor blocks concurrently based on the $M_1$ first tensor block indexes and the $M_2$ second tensor block indexes. The first-type tensor blocks that are processed concurrently by the P processing units in the first time period are determined from the M tensor blocks based on the first tensor block indexes, and the second-type tensor blocks that are processed concurrently by the P processing units in the second time period are determined from the M tensor blocks based on the second tensor block indexes. In the foregoing technical solution, the tensor block index is saved in specific storage space. In this case, the data processing apparatus may directly obtain the tensor block index from the specific storage space, to obtain a corresponding tensor block as soon as possible, thereby increasing a processing speed of the tensor block.

With reference to the first aspect, in a possible embodiment of the first aspect, the $M_1$ first tensor block indexes are stored in the first storage space in a consecutive manner, and the $M_2$ second tensor block indexes are stored in the second storage space in a consecutive manner. In the foregoing technical solution, because the $M_1$ first tensor block indexes and the $M_2$ second tensor block indexes are stored in a consecutive manner, speeds at which the data processing apparatus obtains the $M_1$ first tensor block indexes and the $M_2$ second tensor block indexes can further be increased.

With reference to the first aspect, in a possible embodiment of the first aspect, a sequence of each of the $M_1$ first tensor block indexes in the first storage space is the same as a sequence of a first-type tensor block indicated by the first tensor block index in the M tensor blocks. A sequence of each of the $M_2$ second tensor block indexes in the second storage space is the same as a sequence of a second-type tensor block indicated by the second tensor block index in the M tensor blocks. In the foregoing technical solution, because saving sequences of the $M_1$ first tensor block indexes and the $M_2$ second tensor block indexes do not change, the data processing apparatus may sequentially obtain the $M_1$ first tensor block indexes and the $M_2$ second tensor block indexes. In other words, the data processing apparatus needs to sort the $M_1$ first tensor block indexes and the $M_2$ second tensor block indexes. In this way, speeds of processing the $M_1$ first tensor block indexes and the $M_2$ second tensor block indexes by the data processing apparatus can further be increased.

With reference to the first aspect, in a possible embodiment of the first aspect, before that P processing units in the data processing apparatus process the M tensor blocks concurrently, the method further includes: The data processing apparatus determines a first correspondence, and the first correspondence is a correspondence between the P processing units and the first-type tensor blocks. The data processing apparatus determines a second correspondence, and the second correspondence is a correspondence between the P processing units and the second-type tensor blocks. That P processing units in the data processing apparatus process the M tensor blocks concurrently includes: The P processing units process the M tensor blocks concurrently based on the first correspondence and the second correspondence. Based on the foregoing technical solution, the P processing units may directly determine, based on the correspondences between the P processing units and the tensor blocks, tensor blocks that need to be processed by the P processing units. In this way, speeds of processing the tensor blocks by the P processing units can be increased.

With reference to the first aspect, in a possible embodiment of the first aspect, the method further includes: The data processing apparatus determines tensor block attribute indication information. The tensor block attribute indication information includes M pieces of indication information, and the M pieces of indication information are respectively used to indicate tensor block attributes of the M tensor blocks. The data processing apparatus determines M tensor block indexes, and the M tensor block indexes are respectively used to indicate the M tensor blocks. That the data processing apparatus determines $M_1$ first tensor block indexes and $M_2$ second tensor block indexes includes: The data processing apparatus determines the $M_1$ first tensor block indexes and the $M_2$ second tensor block indexes from the M tensor block indexes based on the M pieces of indication information. According to the foregoing technical solution, the data processing apparatus can quickly determine tensor block indexes with a same attribute by using the attribute indication information.

With reference to the first aspect, in a possible embodiment of the first aspect, that the data processing apparatus determines the $M_1$ first tensor block indexes and the $M_2$ second tensor block indexes from the M tensor block indexes based on the M pieces of indication information includes: The data processing apparatus determines first location information based on the M pieces of indication information. The first location information is used to indicate a location of each piece of first indication information in the M pieces of indication information in the $M_1$ pieces of first indication information. The tensor block attribute indicated by the $M_1$ pieces of first indication information is the first attribute. The data processing apparatus determines second location information based on the M pieces of indication information. The second location information is used to indicate a location of each piece of second indication information in the M pieces of indication information in the $M_2$ pieces of second indication information. The tensor block attribute indicated by the $M_2$ pieces of second indication information is the second attribute. The data processing apparatus determines the $M_1$ first tensor block indexes based on the first location information. The data processing apparatus determines the $M_2$ second tensor block indexes based on the second location information. According to the foregoing technical solution, the data processing apparatus can quickly determine the tensor block indexes with the same attribute by using the attribute indication information.

According to a second aspect, an embodiment of this application provides a data processing apparatus. The data processing apparatus includes a storage unit and P processing units. The P processing units may implement any one of the first aspect or the possible embodiments of the first aspect in combination with the storage unit.

According to a third aspect, an embodiment of this application provides a data processing apparatus. The apparatus includes a processor and a memory. The memory stores an instruction used to implement the method according to any one of the first aspect or the possible embodiments of the first aspect, and the processor may perform any one of the first aspect or the possible embodiments of the first aspect based on the instruction stored in the memory.

According to a fourth aspect, an embodiment of this application provides a storage medium. The storage medium stores an instruction used to implement the method in any one of the first aspect or the possible embodiments of the first aspect.

According to a fifth aspect, this application provides a computer program product including an instruction. When the computer program product is run on a computer, the computer is enabled to perform the method according to any one of the first aspect or the possible embodiments of the first aspect.

BRIEF DESCRIPTION OF DRAWINGS

FIG. 3 is a schematic diagram of a foreground labeling result;

FIG. 4 is a schematic diagram of a tensor block attribute labeling result;

FIG. 5 is a schematic diagram of 12×12 tensor block indexes;

FIG. 6 is a schematic diagram of first location information;

FIG. 7 is a schematic diagram of second location information;

FIG. 8 is a schematic diagram of an arranged tensor block index;

DESCRIPTION OF EMBODIMENTS

The following describes technical solutions in this application with reference to the accompanying drawings.

In this application, "at least one" means one or more, and "a plurality of" means two or more. "And/or" describes an association relationship between associated objects and may indicate three relationships. For example, A and/or B may indicate the following cases: Only A exists, both A and B exist, and only B exists. A and B may be singular or plural. The character "/" generally indicates an "or" relationship between the associated objects. "At least one of the following items (i.e., pieces)" or a similar expression thereof means any combination of these items, including a single item or any combination of a plurality of items. For example, at least one of a, b, or c may indicate: a, b, c, a-b, a-c, b-c, or a-b-c, where a, b, and c may be in a singular or plural form. In addition, in the embodiments of this application, words such as "first" and "second" do not limit a quantity or an execution sequence.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "for example" or "example" or the like is intended to present a relative concept in a specific manner.

A data processing apparatus in the embodiments of this application may be any apparatus that can process a tensor, for example, a computer (including a personal computer, a notebook computer, a desktop computer, or the like), a server, a network device, or a dedicated computer device that can process a tensor.

Figure 1:
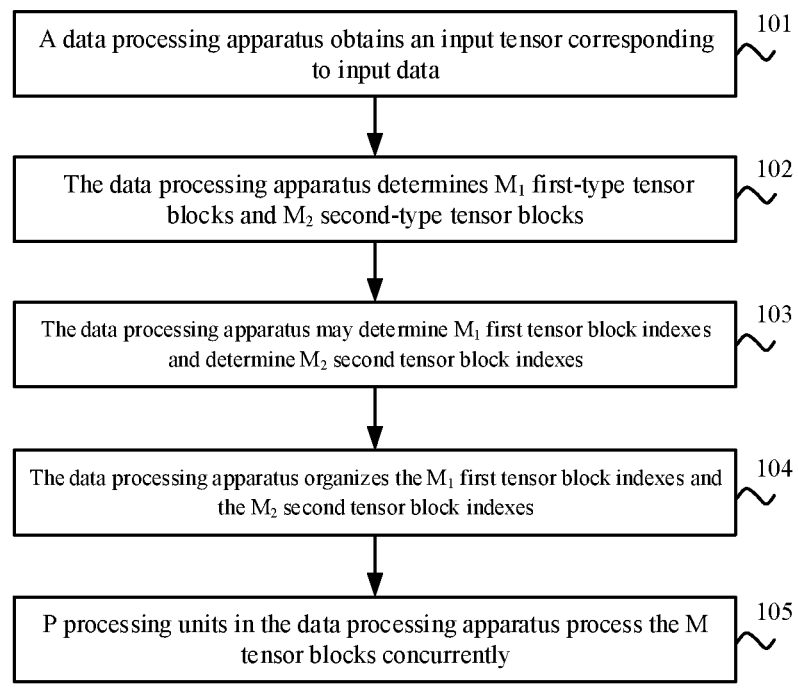
FIG. 1 is a schematic flowchart of a data processing method according to an embodiment of this application.

FIG. 1 is a schematic flowchart of a data processing method according to an embodiment of this application.

101: A data processing apparatus obtains an input tensor corresponding to input data, where the input tensor is an N-dimensional tensor, and N is a positive integer greater than or equal to 1. The input tensor consists of M tensor blocks, and M is a positive integer greater than or equal to 2.

A type of the input data is not limited in this embodiment of this application. For example, the input data may be a video image, audio, an image, or the like. The input tensor corresponding to the input data may be the input data itself, or may be a part of the input data. For example, it is assumed that the input data is a segment of video image. A total length of the segment of video image is 10 seconds. However, the first three seconds of the segment of video image are static images, and moving objects appear from the fourth second. Therefore, an input tensor corresponding to this segment of video image may be a tensor from the fourth second to the end of the video. For another example, it is assumed that the input data is an image. A tensor of a part of the image obtained by segmenting the image is an input tensor corresponding to the image.

102: The data processing apparatus determines $M_1$ first-type tensor blocks and $M_2$ second-type tensor blocks, where the first-type tensor block is a tensor block whose tensor block attribute is a first attribute in the M tensor blocks, the second-type tensor block is a tensor block whose tensor block attribute is a second attribute in the M tensors, and $M_1$ and $M_2$ are positive integers greater than or equal to 1.

The input tensor can be divided into the M tensor blocks. Each of the M tensor blocks may include $f_1 \times m_2 \times \ldots \times m_n$ elements, where $m_1, m_2, \ldots, m_n$, and n all are positive integers greater than or equal to 1, and n is a tensor dimension. How to divide the input tensor into the tensor blocks is not limited in this embodiment of this application.

It is assumed that the input tensor is an image. The image may be divided into a plurality of image blocks, and various types of operations are performed by using the image block as a basic unit, such as, block-based prediction, block-based transformation, and block-based entropy encoding. The image block herein is equivalent to the tensor block. The image block refers to a three-dimensional point array of a length-width color channel that is sampled in a length-width two-dimensional manner, and length-width two dimensions may be in a square or a rectangle shape. The element in the image block refers to a sampling value of the element in the image block. The element may also be referred to as a sampling point, a sub-pixel point, a sub-pixel, or the like. Correspondingly, the value of the element may also be referred to as a sub-pixel value.

It is assumed that the input tensor is an image. The image may be divided into a plurality of image blocks, and various types of operations are performed by using the image block as a basic unit, such as, block-based prediction, block-based transformation, and block-based entropy encoding. The image block herein is equivalent to the tensor block. The image block refers to a two-dimensional sampling point array, which may be a square array or a rectangular array. The element in the image block refers to a sampling value of the element in the image block. The element may also be referred to as a sampling point, a pixel point, a pixel, or the like. Correspondingly, the value of the element may also be referred to as a pixel value.

Each of the M tensor blocks may be divided into tensor blocks with different attributes based on an attribute of an element included in the tensor block. For ease of description, the attribute of the tensor block is referred to as a tensor block attribute, and the attribute of the element is referred to as an element attribute below. Specifically, the tensor block attribute may include the first attribute and the second attribute. For example, it is assumed that the input tensor is an image. The image may be divided into a foreground and a background. The first attribute may be the foreground, and the second attribute may be the background. For another example, it is assumed that the input tensor is audio. The audio may be divided into speech and noise. The first attribute may be the speech, and the second attribute may be the noise. For ease of description, the tensor block whose tensor block attribute is the first attribute is referred to as the first-type tensor block, and the tensor block whose tensor block attribute is the second attribute is referred to as the second-type tensor block.

In the foregoing example, it is assumed that the first attribute is the foreground, and the second attribute is the background; or the first attribute is the speech, and the second attribute is the noise. This helps better understand the first attribute and the second attribute, instead of limiting content corresponding to the first attribute and the second attribute. For example, in some other embodiments, the first attribute may be the background, and the second attribute may be the foreground. The first attribute may be the noise, and the second attribute may be the speech.

It is assumed that M represents a quantity of all tensor blocks included in the input tensor. In other words, the input tensor consists of the M tensor blocks. $M_1$ represents a quantity of first-type tensor blocks in the M tensor blocks, and $M_2$ represents a quantity of second-type tensor blocks in the M tensor blocks. In this embodiment, a sum of $M_1$ and $M_2$ is M.

Optionally, in some embodiments, the M tensor blocks may include the first-type tensor block and the second-type tensor block. Both $M_1$ and $M_2$ are positive integers greater than or equal to 1, and a sum of $M_1$ and $M_2$ is M.

Optionally, in some embodiments, all tensor blocks in the M tensor blocks may be the first-type tensor blocks. In other words, all the M tensor blocks are the first-type tensor blocks. In this case, M is equal to $M_1$, and $M_2$ is equal to 0.

Optionally, in some embodiments, all tensor blocks in the M tensor blocks may be the second-type tensor blocks. In other words, all the M tensor blocks are the second-type tensor blocks. In this case, $M_1$ is equal to 0, and $M_2$ is equal to M.

As described above, each of the M tensor blocks may be divided into the tensor blocks with the different attributes based on the attribute of the element included in each tensor block. Specifically, element attributes of elements in each tensor block may also be classified into the first attribute and the second attribute. An image is used as an example. An element attribute of each element may be the foreground or the background.

How to determine the attribute of the tensor block based on the attribute of the element included in each tensor block is not limited in this embodiment of this application.

For example, in some embodiments, as long as there is one element whose element attribute is the first attribute in one tensor block, a tensor block attribute of the tensor block is the first attribute. If element attributes of all elements in one tensor block each are the second attribute, a tensor block attribute of the tensor block is the second attribute. In other words, the tensor block whose element attributes of all elements included in the tensor block each are the second attribute is the second-type tensor block. Another tensor block is the first-type tensor block.

For another example, in some embodiments, as long as there is one element whose element attribute is the second attribute in one tensor block, a tensor block attribute of the tensor block is the second attribute. If element attributes of all elements in one tensor block each are the first attribute, a tensor block attribute of the tensor block is the first attribute. In other words, the tensor block whose element attributes of all elements included in the tensor block each are the first attribute is the first-type tensor block. Another tensor block is the second-type tensor block.

For another example, in some embodiments, if a quantity of elements whose element attribute is the first attribute in one tensor block is greater than a preset value, a tensor block attribute of the tensor block is the first attribute. If a quantity of elements whose element attribute is the first attribute in one tensor block is not greater than the preset value, a tensor block attribute of the tensor block is the second attribute. The preset value may be any value greater than or equal to 1 and less than or equal to the quantity of elements included in the tensor block. Optionally, in some embodiments, the preset value may be 1. Optionally, in some other embodiments, the preset value may be a half of the quantity of elements included in the tensor block. If the quantity of elements included in the tensor block is an odd number, the preset value may be an integer obtained by rounding up or down a quotient that is obtained by dividing the quantity of elements included in the tensor block by 2. Optionally, in some other embodiments, the preset value may be equal to a quantity of elements included in one tensor block.

For another example, in some embodiments, if a proportion of elements whose element attribute is the first attribute in one tensor block is greater than a preset percentage, a tensor block attribute of the tensor block is the first attribute. The preset percentage may be any value greater than or equal to 0 and less than or equal to 100%. Optionally, in some embodiments, the preset percentage may be 0. Optionally, in some embodiments, the preset percentage may be 50%. Optionally, in some other embodiments, the preset percentage may be 100%.

A manner of determining the element attribute of each element is not limited in this embodiment of this application. The element attribute of each element may be determined by using the current technology. For example, if the input data is video data, algorithms such as an inter-frame difference method, a background difference method, and a visual background extraction (ViBe) algorithm may be used to determine the foreground and the background in the image, to determine whether each element is the foreground or the background, and further determine whether a tensor block attribute of each tensor block is the first attribute or the second attribute.

The foregoing describes only how to determine the tensor block attribute when the tensor block attribute includes the first attribute and the second attribute. In some other embodiments, the tensor block attribute may further include a third attribute or even a fourth attribute. In this case, for embodiments of an implementation of determining the tensor block attribute of the tensor block, refer to the foregoing manner. Details are not described herein again.

103: The data processing apparatus may determine $M_1$ first tensor block indexes, where the $M_1$ first tensor block indexes are respectively used to indicate the $M_1$ first-type tensor blocks. The data processing apparatus may further determine $M_2$ second tensor block indexes, where the $M_2$ second tensor block indexes are respectively used to indicate the $M_2$ second-type tensor blocks. In other words, the data processing apparatus determines M tensor block indexes in total, and the M tensor block indexes are respectively used to indicate the M tensor blocks. A tensor block index whose tensor block attribute of the indicated tensor block in the M tensor block indexes is the first attribute is the first tensor block index. Tensor block information whose tensor block attribute of the indicated tensor block in the M tensor block indexes is the second attribute is the second tensor block index.

Optionally, in some embodiments, the data processing apparatus may first determine tensor block attribute indication information. The tensor block attribute indication information includes M pieces of indication information, and the M pieces of indication information are respectively used to indicate tensor block attributes of the M tensor blocks.

A size of each of the M pieces of indication information may be determined based on a quantity of attributes.

For example, if the tensor block attribute includes only the first attribute and the second attribute, a size of each of the M pieces of indication information may be 1 bit. If a value of the indication information is 1, it indicates that a tensor block attribute of a tensor block indicated by the indication information is the first attribute. If a value of the indication information is 0, it indicates that a tensor block attribute of a tensor block indicated by the indication information is the second attribute.

For another example, if the tensor block attribute includes the first attribute, the second attribute, the third attribute, and the fourth attribute, a size of each of the M pieces of indication information may be 2 bits. If a value of the indication information is 00, it indicates that a tensor block attribute of a tensor block indicated by the indication information is the first attribute. If a value of the indication information is 01, it indicates that a tensor block attribute of a tensor block indicated by the indication information is the second attribute. If a value of the indication information is 10, it indicates that a tensor block attribute of a tensor block indicated by the indication information is the third attribute. If a value of the indication information is 11, it indicates that a tensor block attribute of a tensor block indicated by the indication information is the fourth attribute.

Further, it is assumed that M is equal to 5. A length of the tensor block attribute indication information is 5 bits. In the 5 bits, the first bit is used to indicate a tensor block attribute of the first tensor block in the five tensor blocks, the second bit is used to indicate a tensor block attribute of the second tensor block in the five tensor blocks, and so on. Assuming that the tensor block attribute indication information is 11000, it indicates that tensor block attributes of the first two tensor blocks in the five tensor blocks each are the first attribute, and tensor block attributes of the last three tensor blocks each are the second attribute.

The data processing apparatus may determine the M tensor block indexes in total, and the M tensor block indexes are respectively used to indicate the M tensor blocks.

Optionally, in some embodiments, the tensor block index may be coordinates of the indicated tensor block. For example, it is assumed that the input tensor is a two-dimensional tensor. The two-dimensional tensor may be divided into X×Y tensor blocks. It is assumed that a tensor block index is (1, 3). A tensor block indicated by the tensor block index is the third tensor block in the first row of the input tensor.

Optionally, in some embodiments, the tensor block index may be a sequence of the indicated tensor block in the M tensor blocks. For example, it is assumed that a tensor block index is 3. It indicates that a tensor block indicated by the tensor block index is the third tensor block in the M tensor blocks. The data processing apparatus may determine coordinates of the tensor block based on a sequence of the tensor block in the M tensor blocks. For example, if the input tensor is a two-dimensional tensor, the two-dimensional tensor can be divided into 2×3 tensor blocks, and a tensor block index is 3. In this case, the data processing apparatus may determine that a tensor block indicated by the tensor block index is the third tensor block in the first row.

It can be learned that each tensor block index in the M tensor block indexes is used to indicate that a corresponding tensor block is which tensor block in the M tensor blocks. Therefore, the data processing apparatus may determine the $M_1$ first tensor block indexes from the M tensor block indexes based on the M pieces of indication information.

Optionally, that the data processing apparatus determines the $M_1$ first tensor block indexes from the M tensor block indexes based on the M pieces of indication information includes: The data processing apparatus determines first location information based on the M pieces of indication information. The first location information is used to indicate a location of each piece of first indication information in the M pieces of indication information in the $M_1$ pieces of first indication information. The tensor block attribute indicated by the $M_1$ pieces of first indication information is the first attribute. The data processing apparatus determines the $M_1$ first tensor block indexes based on the first location information.

It is assumed that eight pieces of indication information are 1, 1, 0, 0, 1, 0, 1, and 1 (where 1 indicates that a tensor block attribute of the indicated tensor block is the first attribute, and 0 indicates that a tensor block attribute of the indicated tensor block is the second attribute). In this case, the first location information is 12223345.1 in 12223345 indicates that indication information in this location is the first piece of first indication information. The first 2 in 12223345 indicates that indication information in this location is the second piece of first indication information. The second 2 and the third 2 in 12223345 indicate that indication information in these locations is second indication information (where a tensor block attribute indicated by the second indication information is the second attribute). The first 3 in 12223345 indicates that indication information in this location is the third piece of first indication information. The second 3 in 12223345 indicates that indication information in this location is second indication information. 4 in 12223345 indicates that indication information in this location is first indication information and the first indication information is the fourth piece of first indication information. 5 in 12223345 indicates that indication information in this location is first indication information and the first indication information is the fifth piece of first indication information. It can be learned that the first location indication information may indicate a location of each piece of first indication information in the $M_1$ pieces of first indication information, that is, a sequence number of the first indication information in the $M_1$ pieces of first indication information. The first location indication information may further indicate whether each piece of indication information is the first indication information. After determining the first location information, the data processing apparatus may determine, based on the first location information, that tensor block indexes of tensor blocks corresponding to the first piece of indication information, the second piece of indication information, and the fifth piece of indication information in the five pieces of indication information are first tensor block indexes.

The first piece of first indication information indicates that, in eight tensor blocks, tensor block attributes of the first, second, fifth, seventh, and eighth tensor blocks each are the first attribute, and tensor block attributes of the third, fourth, and sixth tensor blocks each are the second attribute. Correspondingly, in eight tensor block indexes used to indicate the eight tensor blocks, the first, second, fifth, seventh, and eighth tensor block indexes are first tensor block indexes, and the third, fourth, and sixth tensor block indexes are second tensor block indexes.

The first location information may be obtained by performing a prefix sum operation on the indication information. Optionally, in some embodiments, the data processing apparatus may include a plurality of processing units. In this case, some or all of the plurality of processing units may process the indication information concurrently (that is, some or all of the plurality of processing units are used to perform a prefix sum operation), to obtain an operation result of the prefix sum operation. The operation result of the prefix sum operation is the first location information.

Optionally, the data processing apparatus may further determine second location information based on the M pieces of indication information. The second location information is used to indicate a location of each piece of second indication information in the M pieces of indication information in the $M_2$ pieces of second indication information. The tensor block attribute indicated by the $M_2$ pieces of second indication information is the second attribute. The data processing apparatus determines the $M_2$ pieces of second indication information based on the second location information.

It is further assumed that eight pieces of indication information are 1, 1, 0, 0, 1, 0, 1, and 1 (where 1 indicates that a tensor block attribute of the indicated tensor block is the first attribute, and 0 indicates that a tensor block attribute of the indicated tensor block is the second attribute). In this case, the second location information is 00122333. For a specific meaning of each number in the second location information, refer to the first location information. Details are not described herein again.

The second location information may also be determined by performing a prefix sum operation. Specifically, before the second location information is determined, the indication information is first negated to obtain 00110100, and the prefix sum operation is performed to obtain 00122333.

Certainly, in some other embodiments, the data processing apparatus may determine the $M_1$ first tensor block indexes based on the tensor block attribute of the tensor block. In other words, the data processing apparatus may not need to first determine the M pieces of indication information. The data processing apparatus may directly determine a location of each first-type tensor block in the M tensor blocks, and then determine a first tensor block index used to indicate each first-type tensor block. For example, if the data processing apparatus determines that a first-type tensor block is the third tensor block in the first row in the M tensor blocks, the data processing apparatus may directly determine that a first tensor block index is (1, 3).

104: The data processing apparatus organizes the $M_1$ first tensor block indexes and the $M_2$ second tensor block indexes.

105: P processing units in the data processing apparatus process the M tensor blocks concurrently, where in a first time period, all of the tensor blocks that are processed concurrently by the P processing units are the first-type tensor blocks; in a second time period, all of the tensor blocks that are processed concurrently by the P processing units are the second-type tensor blocks; the first time period does not overlap the second time period, and P is a positive integer greater than or equal to 2.

Optionally, in some embodiments, that the data processing apparatus organizes the $M_1$ first tensor block indexes may include: The data processing apparatus saves the $M_1$ first tensor block indexes in first storage space. In this case, the data processing apparatus may obtain the $M_1$ first tensor block indexes from the first storage space, and process the $M_1$ first-type tensor blocks indicated by the $M_1$ first tensor block indexes. In other words, the $M_1$ first address tensor block indexes may be stored in specific storage space. As long as the data processing apparatus needs to obtain the $M_1$ first tensor block indexes, the data processing apparatus may directly read the specific storage space to obtain the $M_1$ first tensor block indexes. In other words, the data processing apparatus may directly determine, without searching, the storage space for saving the $M_1$ first tensor block indexes, and read the $M_1$ first tensor block indexes from the storage space. In this way, a speed at which the data processing apparatus obtains the $M_1$ first tensor block indexes can be increased, thereby increasing a speed of processing the input tensor.

Correspondingly, that the data processing apparatus organizes the $M_2$ second tensor block indexes may include: The data processing apparatus saves the $M_2$ second tensor block indexes in second storage space. In this case, the data processing apparatus may obtain the $M_2$ second tensor block indexes from the second storage space, and process the $M_2$ second-type tensor blocks indicated by the $M_2$ second tensor block indexes. In other words, the $M_2$ second address tensor block indexes may be stored in specific storage space. As long as the data processing apparatus needs to obtain the $M_2$ second tensor block indexes, the data processing apparatus may directly read the specific storage space to obtain the $M_2$ second tensor block indexes. In other words, the data processing apparatus may directly determine, without searching, the storage space for saving the $M_2$ second tensor block indexes, and read the $M_2$ second tensor block indexes from the storage space. In this way, a speed at which the data processing apparatus obtains the $M_2$ second tensor block indexes can be increased, thereby increasing a speed of processing the input tensor.

Optionally, in some embodiments, the $M_1$ first tensor block indexes may be stored in the first storage space in a consecutive manner, and the $M_2$ second tensor block indexes may be stored in the second storage space in a consecutive manner. In this way, the speed at which the data processing apparatus obtains the $M_1$ first tensor block indexes can further be increased, thereby further increasing a speed of processing the input tensor.

Optionally, in some embodiments, storage in a consecutive manner and variants thereof may mean that storage units used to store the tensor block indexes are consecutive. The first storage space may include a plurality of storage units, and the $M_1$ first tensor block indexes may be stored in consecutive storage units in the plurality of storage units. Similarly, the second storage space may also include a plurality of storage units, and the $M_2$ second tensor block indexes may be stored in consecutive storage units in the plurality of storage units.

A manner of storing the tensor block index by the storage unit is not limited in this embodiment of this application.

For example, in some embodiments, a storage unit may store one tensor block index. The first tensor block index is used as an example. The $M_1$ first tensor block indexes may be stored in $M_1$ consecutive storage units in the first storage space. In this way, the P processing units can quickly obtain, from the $M_1$ consecutive storage units, tensor block indexes that need to be processed.

For another example, in some other embodiments, a storage unit may store a plurality of tensor block indexes. It is assumed that a storage unit may store two tensor block indexes. The first tensor block index is still used as an example. The $M_1$ first tensor block indexes may be stored in $M_1/2$ consecutive storage units in the first storage space. In this way, the P processing units can quickly obtain, from the $M_1/2$ consecutive storage units, tensor block indexes that need to be processed.

Optionally, in some other embodiments, storage in a consecutive manner and variants thereof may mean that storage addresses used to point to the storage units are consecutive. In other words, the storage units used to store the tensor block indexes are not necessarily consecutive, but the corresponding storage addresses are consecutive.

For example, it is assumed that a storage unit may store one tensor block index. The first tensor block index is used as an example. The $M_1$ first tensor block indexes may be stored in the $M_1$ storage units in the first storage space. Each storage unit has a storage address. $M_1$ storage addresses corresponding to the $M_1$ storage units are consecutive. In this way, the P processing units can quickly obtain, based on the consecutive storage addresses, tensor block indexes that need to be processed.

Certainly, in some other embodiments, the $M_1$ first tensor block indexes may alternatively not be stored in the first storage space in a consecutive manner, and the $M_2$ second tensor block indexes may alternatively not be stored in the second storage space in a consecutive manner. For example, an address in the first storage space does not save the first tensor block index. In this way, the data processing apparatus needs to find, from the first storage space, addresses at which the $M_1$ first tensor block indexes are saved. Compared with storing the $M_1$ first tensor block indexes in a consecutive manner, storing the $M_1$ first tensor block indexes in an inconsecutive manner decreases the speed of obtaining the $M_1$ first tensor block indexes by the data processing apparatus to some extent.

The data processing apparatus may include the P processing units, where P is a positive integer greater than or equal to 2. The P processing units may obtain the $M_1$ first tensor block indexes concurrently, and process the $M_1$ first-type tensor blocks indicated by the $M_1$ first tensor block indexes concurrently. Because the P processing units process the $M_1$ first-type tensor blocks concurrently, the P processing units may process P first-type tensor blocks simultaneously. In other words, at a same moment, the P first-type tensor blocks in the $M_1$ first-type tensor blocks are processed simultaneously. Obviously, this is faster than a case in which only one first-type tensor block is processed at a time. Similarly, the P processing units may also obtain the $M_2$ second tensor block indexes concurrently, and process the $M_2$ second-type tensor blocks indicated by the $M_2$ second tensor block indexes concurrently. Because the P processing units process the $M_2$ second-type tensor blocks concurrently, the P processing units may process P second-type tensor blocks simultaneously. In other words, at a same moment, the P second-type tensor blocks in the $M_2$ second-type tensor blocks are processed simultaneously. It is clear that a speed in this case is faster than that in a case in which only one second-type tensor block is processed at a time.

Optionally, in some embodiments, a sequence of each of the $M_1$ first tensor block indexes in the first storage space is the same as a sequence of a first-type tensor block indicated by the first tensor block index in the M tensor blocks. For example, it is assumed that M is equal to 10. The 10 tensor blocks include three first-type tensor blocks in total (that is, $M_1$ is equal to 3): respectively the first tensor block, the sixth tensor block, and the eighth tensor block. There are three first tensor blocks in total respectively indicating the three first-type tensor blocks. The three first tensor block indexes are a tensor block index 1, a tensor block index 2, and a tensor block index 3. The tensor block index 1 is used to indicate the first tensor block, the tensor block index 2 is used to indicate the sixth tensor block, and the tensor block index 3 is used to indicate the eighth tensor block. A sequence of the tensor block index 1, the tensor block index 2, and the tensor block index 3 in the first storage space is successively: the tensor block index 1, the tensor block index 2, and the tensor block index 3. It can be learned that the tensor block index 1 is located before the tensor block index 2 and the tensor block index 3, and the first tensor block indicated by the tensor block index 1 is located before the tensor block indicated by the tensor block index 2 and the tensor block indicated by the tensor block index 3. Similarly, the tensor block index 2 is located after the tensor block index 1 and before the tensor block index 3. The sixth tensor block indicated by the tensor block index 2 is located after the tensor block indicated by the tensor block index 1 and before the tensor block indicated by the tensor block index 3. Similarly, a sequence of each of the $M_2$ second tensor block indexes in the second storage space is the same as a sequence of a second-type tensor block indicated by the second tensor block index in the M tensor blocks. Embodiments of specific implementation a are similar to that of the first-type tensor block index. Details are not described herein.

Optionally, in some embodiments, the data processing apparatus may include the P processing units, where P is a positive integer greater than or equal to 2. That the data processing apparatus organizes the $M_1$ first tensor block indexes and the $M_2$ second tensor block indexes may include: The data processing apparatus determines a first correspondence and a second correspondence. The first correspondence is a correspondence between the P processing units and the $M_1$ first tensor block indexes. The second correspondence is a correspondence between the P processing units and the $M_2$ second tensor block indexes. Each of the P processing units obtains, based on the correspondence, a first tensor block index corresponding to each processing unit, and processes a first-type tensor block indicated by the obtained first tensor block index; and obtains, based on the correspondence, a second tensor block index corresponding to each processing unit, and processes a second-type tensor block indicated by the obtained second tensor block index.

For example, it is assumed that P is equal to 2, and $M_1$ is equal to 10. The two processing units are a processing unit 1 and a processing unit 2. The data processing apparatus may determine that the processing unit 1 corresponds to the first, the third, the fifth, the seventh, and the ninth first tensor block indexes in the 10 first tensor block indexes, and that the processing unit 2 corresponds to the second, the fourth, the sixth, the eighth, and the tenth first tensor block indexes in the 10 first tensor block indexes. The processing unit 1 may obtain the first, the third, the fifth, the seventh, and the ninth first tensor block indexes in the tenth first tensor block index based on the foregoing correspondence. The processing unit 2 may obtain the second, the fourth, the sixth, the eighth, and the tenth first tensor block indexes in the 10 first tensor block indexes based on the foregoing correspondence. In this way, each of the P processing units can directly obtain, based on the correspondence between the tensor block index and the processing unit, a first tensor block index that needs to be processed by each processing unit. Compared with obtaining the first tensor block index in a polling manner, in the foregoing solution, a speed of processing the first tensor block index can be increased. For example, if the P processing units obtain the $M_1$ first tensor block indexes in the polling manner, each of the P processing units can learn of a specific to-be-obtained first tensor block index after a previous processing unit obtains a first tensor block index. However, if the previous processing unit cannot obtain the first tensor block index temporarily, a processing unit that next to the previous processing unit cannot obtain the first tensor block index either. However, in the foregoing technical solution, each processing unit may learn of specific to-be-obtained first tensor block indexes in advance. Before obtaining the first tensor block index, each processing unit may directly obtain, without needing to wait for another processing unit to obtain a to-be-processed first tensor block index, a first tensor block index that needs to be processed. In this way, a speed of obtaining the first tensor block index by each of the P processing units can be increased, thereby increasing a speed of processing the input tensor. A manner in which the P processing units process the second-type tensor blocks is similar. Details are not described herein again.

Optionally, in some other embodiments, the data processing apparatus may directly determine a correspondence between the P processing units and the $M_1$ first-type tensor blocks and a correspondence between the P processing units and the $M_2$ second-type tensor blocks. Similarly, the data processing apparatus may determine a first correspondence, and the first correspondence is a correspondence between the P processing units and the first-type tensor blocks. The data processing apparatus may further determine a second correspondence, and the second correspondence is a correspondence between the P processing units and the second-type tensor blocks. In this way, each of the P processing units can directly obtain, based on the correspondence between the tensor block and the processing unit, a tensor block that needs to be processed by each processing unit. Compared with obtaining the tensor block in a polling manner, in the foregoing solution, a speed of processing the tensor block can be increased. For example, if the P processing units obtain the $M_1$ first-type tensor blocks in the polling manner, each of the P processing units can learn of a specific to-be-obtained first-type tensor block after a previous processing unit obtains a first-type tensor block. However, if the previous processing unit cannot obtain the first-type tensor block temporarily, the processing unit next to the previous processing unit cannot obtain the first-type tensor block either. However, in embodiments of the foregoing technical solution, each processing unit may learn in advance that which tensor blocks need to be obtained. Before obtaining the tensor block, each processing unit may directly obtain, without needing to wait for another processing unit to obtain a to-be-processed tensor block, a tensor block that needs to be processed. In this way, a speed of obtaining the tensor block by each of the P processing units can be increased, thereby increasing a speed of processing the input tensor.

Optionally, in some other embodiments, after determining the $M_1$ first-type tensor blocks and the $M_2$ second-type tensor blocks, the data processing apparatus may directly process the M tensor blocks concurrently. In other words, the data processing apparatus may directly perform step 105 after performing step 102.

Optionally, in some other embodiments, after determining first-type tensor blocks that can be processed concurrently by the P processing units, the data processing apparatus may directly process the determined first-type tensor blocks concurrently instead of processing the first-type tensor blocks concurrently after all the first-type tensor blocks are determined. Similarly, after determining second-type tensor blocks that can be processed concurrently by the P processing units, the data processing apparatus may directly process the determined second-type tensor blocks concurrently instead of processing the second-type tensor blocks concurrently after all the second-type tensor blocks are determined. In other words, step 105 may not need to be performed after step 102 is performed.

For example, it is assumed that the input tensor can be divided into 20 tensor blocks. The first tensor block to the fifth tensor block, and the $11^{th}$ to the $15^{th}$ tensor blocks are the first-type tensor blocks. The sixth to the tenth tensor blocks, and the $16^{th}$ to $20^{th}$ tensor blocks are the second-type tensor blocks. It is assumed that P is equal to 5. The data processing apparatus may sequentially determine whether the 20 tensor blocks are the first-type tensor blocks or the second-type tensor blocks. After the data processing apparatus determines that the first five tensor blocks in the 20 tensor blocks are the first-type tensor blocks, the five processing units may process the five tensor blocks concurrently. After the data processing apparatus determines that the sixth tensor block to the tenth tensor block are the second-type tensor blocks, if the five processing units have processed the first five tensor blocks concurrently, the five processing units may start to process the sixth tensor block to the tenth tensor block concurrently, and so on.

In addition, in some embodiments, when processing the M tensor blocks concurrently, the P processing units may first determine whether to-be-processed tensor blocks are the first-type tensor blocks or the second-type tensor blocks. If the P processing units determine that all the to-be-processed tensor blocks are the first-type tensor blocks, the P processing units may process the first-type tensor blocks concurrently. If one or more processing units in the P processing units determine that the to-be-processed tensor block is the second-type tensor block, the one or more processing units may continue to determine a type of the to-be-processed tensor block until it is determined that the to-be-processed tensor block is the first-type tensor block, and the P processing units may process the first-type tensor blocks concurrently. It can be learned that step 102 may not need to be performed in this case. In other words, step 105 may be directly performed after step 101.

How a processing unit processes the tensor block is not limited in this embodiment of this application. For example, tensor operations such as convolution sum, exterior algebra, transposition, and covariant derivative can be performed on the elements in the tensor block.

The following uses an image as an example to describe how to process the image with reference to the method shown in FIG. 1.

Figure 2:
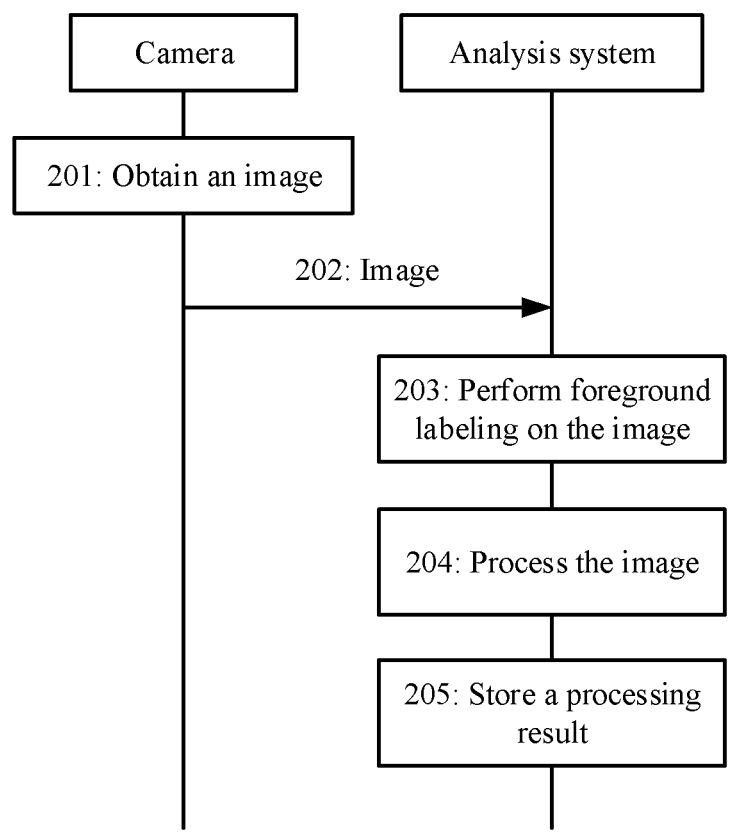
FIG. 2 is a schematic flowchart of an image processing method according to an embodiment of this application.

FIG. 2 is a schematic flowchart of an image processing method according to an embodiment of this application.

201: A camera obtains an image.

The image typically has three dimensions: a height, a width, and a color depth. A grayscale image has only one color channel, and therefore can be stored as a two-dimensional tensor. However, a tensor of the image is usually three-dimensional. Therefore, the grayscale image is represented by a one-dimensional color channel. 128 grayscale images with a size of 256×256 are stored as a tensor with a shape of (128, 256, 256, 1). 128 represents a quantity of images, the first 256 represents a height of the image, the second 256 represents a width of the image, and 1 indicates a quantity of color channels of the image. 128 color images are stored as a tensor with a shape of (128, 256, 256, 3). For ease of description, in the following embodiment, it is assumed that a processed tensor is of a grayscale image with a size of 26×26, and it is assumed that a batch of the processed grayscale image is 0.

202: The camera sends the obtained image to an analysis system.

203: The analysis system performs foreground labeling processing on the image.

Specifically, the analysis system may determine a foreground and a background in the image, and record a determining result. The analysis system may determine the foreground and the background in the image by using algorithms such as an inter-frame difference method, a background difference method, and a ViBe algorithm, to determine whether each element in the image is the foreground or the background, and record a determining result.

Figure 3:
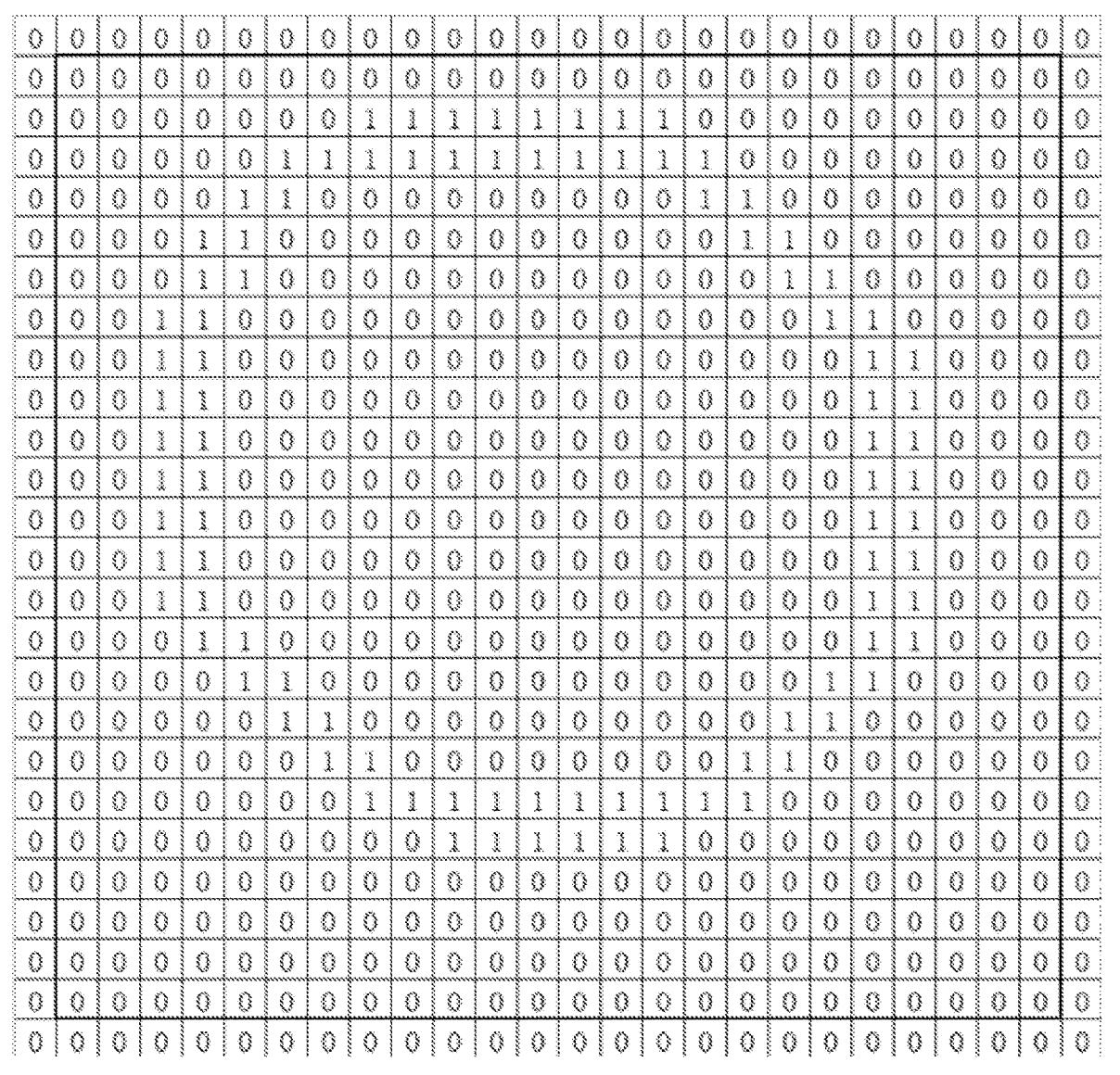

FIG. 3 shows a foreground labeling result recorded by the analysis system. FIG. 3 includes 26×26 blocks in total, and each block represents one element of the image. In other words, the image includes 26×26 elements in total. A value in the box indicates whether an element attribute of an element represented by the box is the foreground or the background. Specifically, a value of 0 indicates that the element represented by the box is the background, and a value of 1 indicates that the element represented by the box is the foreground.

204: The analysis system processes the image.

The method shown in FIG. 1 is a method for processing the image by the analysis system in step 204. Specifically, the image is equivalent to the input data in the embodiment shown in FIG. 1. An input tensor corresponding to the input data is the image itself. An apparatus for processing the image in the analysis system may be the data processing apparatus shown in FIG. 1.

The following describes a method for processing the image by the analysis system with reference to FIG. 3 to FIG. 8.

A tensor block attribute of each tensor block is determined based on the foreground labeling result shown in FIG. 3, to obtain a tensor block attribute labeling result shown in FIG. 4. It is assumed that each tensor block has a size of 4×4 and a step size of 2. In other words, the first tensor block includes the first four rows of elements from the first column to the fourth column of the image, the second tensor block includes the first four rows of elements from the third column to the sixth column of the image, and so on. If an attribute of an element in each tensor block is the foreground, an attribute of the tensor block is the foreground. Therefore, the tensor block attribute labeling result shown in FIG. 4 may be obtained according to the foregoing rule and based on the foreground labeling result shown in FIG. 3. The tensor block attribute labeling result shown in FIG. 4 includes 12×12 blocks in total. Each box corresponds to one tensor block. In other words, a 26×26 image processed by the analysis system is divided into 12×12 (that is, 144) tensor blocks. A value in the box indicates a tensor block attribute of a tensor block corresponding to the box. Specifically, a value of 0 indicates that the attribute of the tensor block corresponding to the block is the background, and a value of 1 indicates that the attribute of the tensor block corresponding to the block is the foreground. The tensor block attribute labeling result shown in FIG. 4 is tensor block attribute indication information used to indicate the tensor block attribute. In other words, the tensor block attribute labeling result is the indication information described in the embodiment shown in FIG. 1.

When the tensor block is determined, tensor block indexes may further be determined. 144 tensor block indexes in total are included, and each tensor block index is used to indicate one tensor block. The tensor block indexes may be presented as tensor block indexes shown in FIG. 5. The tensor block indexes shown in FIG. 5 include 12×12 blocks in total. A value in each box represents one tensor block index. For example, the tensor block index at the top-left corner is (0, 1, 1), and the tensor block index indicates that a tensor block indicated by the tensor block index is the first tensor block in the first row of the 12×12 tensor blocks, and a batch is 0.

Figure 5:
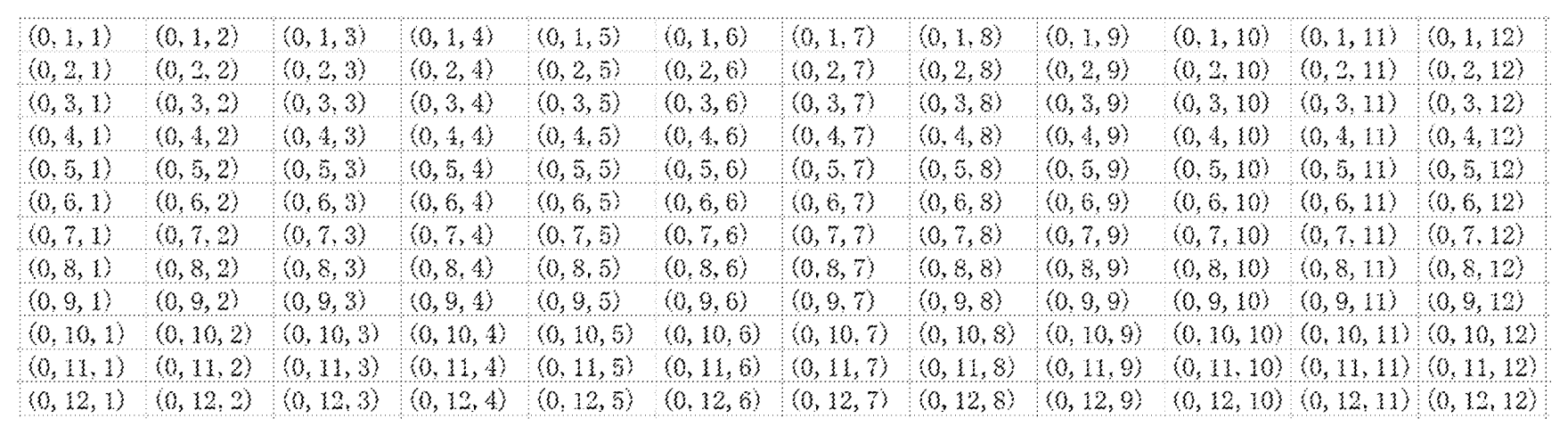

It can be learned that the 12×12 tensor block indexes shown in FIG. 5 one-to-one correspond to 12×12 pieces of indication information shown in FIG. 4. For example, the first piece of indication information in the first row shown in FIG. 4 is used as an example. A value of the indication information is 0. Therefore, a tensor block attribute of a tensor block indicated by the indication information is the background. The indication information corresponds to the first tensor block index in the first row shown in FIG. 5. Therefore, a tensor block attribute of a tensor block indicated by the first tensor block index in the first row shown in FIG. 5 is the background. Therefore, based on the correspondence between the indication information and the tensor block index, a first tensor block index whose tensor attribute of the tensor block indicated in the tensor block index is the foreground may be determined (it is assumed that the foreground is a first attribute and the background is a second attribute).

First location information may further be determined concurrently by using a plurality of processing units based on the indication information shown in FIG. 4. Specifically, the first location information may be determined by performing a prefix sum operation. The determined first location information may be shown in FIG. 6.

Correspondingly, second location information may further be determined based on the indication information shown in FIG. 4. The second location information may be shown in FIG. 7.

First tensor block indexes and second tensor block indexes may be determined from the 12×12 tensor block indexes based on the first location information shown in FIG. 6 and the second location information shown in FIG. 7. The first tensor block indexes and the second tensor block indexes are arranged, to obtain arranged tensor block indexes shown in FIG. 8.

Figure 8:
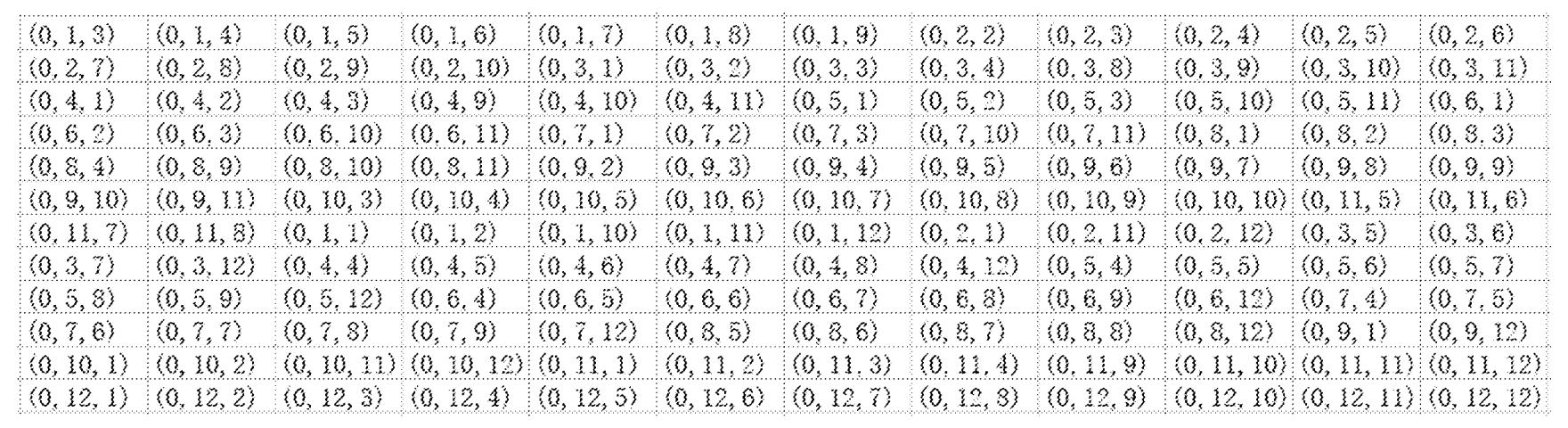

As shown in FIG. 8, in the arranged tensor block indexes, the first 74 tensor block indexes are the first tensor block indexes, and the last 70 tensor block indexes are the second tensor block indexes. Optionally, in some embodiments, 144 tensor block indexes (that is, the 74 first tensor block indexes and the 70 second tensor block indexes) may be saved in specific storage space in a sequence shown in FIG. 8. It can be learned that a sequence of each first tensor block index in the tensor block indexes shown in FIG. 8 in the 74 first tensor block indexes is the same as a sequence in FIG. 5. For example, in each of FIG. 5 and FIG. 8, a first tensor block index with content (1, 3) is located before a first tensor block index with content (1, 4), and a first tensor block index with content (2, 2) is located before a first tensor block index with content (2, 3).

It is assumed that there are 36 processing units in total for processing the tensor blocks. The 36 processing units may process first-type tensor blocks indicated by the first tensor block indexes and second-type tensor blocks indicated by the second tensor block indexes concurrently.

Optionally, in some embodiments, the 36 processing units may first process first-type tensor blocks concurrently, and then process second-type tensor blocks concurrently. Optionally, in some other embodiments, the 36 processing units may first process the second-type tensor blocks concurrently, and then process the first-type tensor blocks concurrently. The following describes how the 36 processing units process the first-type tensor blocks and the second-type tensor blocks concurrently by using an example in which the first-type tensor blocks are first processed concurrently and then the second-type tensor blocks are processed concurrently.

Optionally, in some embodiments, the 36 processing units may first process the first 72 first-type tensor blocks, and then process the last two first-type tensor blocks and the 70 second-type tensor blocks. Specifically, in the 36 processing units, the first processing unit processes the first first-type tensor block, the second processing unit processes the second first-type tensor block, . . . , and the $36^{th}$ processing unit processes the $36^{th}$ first-type tensor block. Then, in the 36 processing units, the first processing unit processes the $37^{th}$ first-type tensor block, the second processing unit processes the $38^{th}$ first-type tensor block, . . . , and the $36^{th}$ processing unit processes the $72^{nd}$ first-type tensor block. Then, in the 36 processing units, the first processing unit processes the $73^{rd}$ first-type tensor block, the second processing unit processes the $74^{th}$ first-type tensor block, the third processing unit processes the first second-type tensor block, the fourth processing unit processes the second second-type tensor block, . . . , and the $36^{th}$ processing unit processes the $34^{th}$ second-type tensor block. Then, in the 36 processing units, the first processing unit processes the $35^{th}$ second-type tensor block, the second processing unit processes the 36$^{th}$ second-type tensor block, . . . , and the 36$^{th}$ processing unit processes the 70$^{th}$ second-type tensor block. It can be learned that in the foregoing processing manner, in a time period, the 36 processing units process only the first-type tensor blocks. In another time period, the 36 processing units process only the second-type tensor blocks.

Optionally, in some other embodiments, the 36 processing units may first process the first 72 first-type tensor blocks, and then process the last two first-type tensor blocks and 70 second-type tensor blocks. Specifically, in the 36 processing units, the first processing unit processes the first first-type tensor block, the second processing unit processes the second first-type tensor block, . . . , and the 36$^{th}$ processing unit processes the 36$^{th}$ first-type tensor block. Then, in the 36 processing units, the first processing unit processes the 37$^{th}$ first-type tensor block, the second processing unit processes the 38$^{th}$ first-type tensor block, . . . , and the 36$^{th}$ processing unit processes the 72$^{nd}$ first-type tensor block. Then, in the 36 processing units, the first processing unit processes the 73$^{rd}$ first-type tensor block, and the second processing unit processes the 74$^{th}$ first-type tensor block. Then, in the 36 processing units, the first processing unit processes the first second-type tensor block, the second processing unit processes the second second-type tensor block, . . . , and the 36$^{th}$ processing unit processes the 36$^{th}$ second-type tensor block. Then, in the 36 processing units, the first processing unit processes the 37$^{th}$ second-type tensor block, the second processing unit processes the 36$^{th}$ second-type tensor block, . . . , and the 34$^{th}$ processing unit processes the 70$^{th}$ second-type tensor block. It can be learned that in the foregoing processing manner, in a time period, the 36 processing units process only the first-type tensor blocks. In another time period, the 36 processing units process only the second-type tensor blocks. 205: The analysis system saves a processing result of the processing unit.

If a convolution operation is performed on the tensor block by the processing unit, the analysis system may obtain, based on the processing result, a feature map of an input image in a corresponding convolution network, and provide a functional module (for example, classification, detection, or segmentation) required by a user for further processing.

Figure 9:
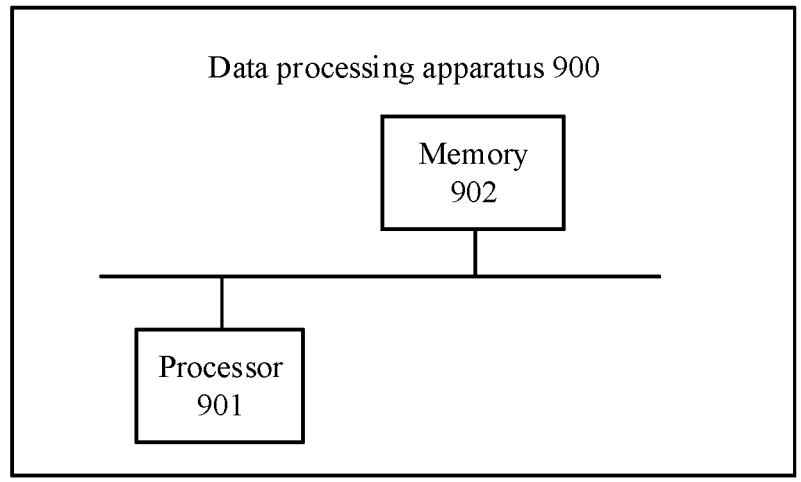
FIG. 9 is a structural block diagram of a data processing apparatus according to an embodiment of the present invention.

FIG. 9 is a structural block diagram of a data processing apparatus according to an embodiment of the present invention. As shown in FIG. 9, the data processing apparatus includes a processor 901 and a memory 902. The processor 901 may include P processing units, where P is a positive integer greater than or equal to 1. The processing unit may also be referred to as a core. In some cases, the processor may be one chip, and the chip includes a plurality of processing units. A processing unit in the processor may be referred to as a core in the processor. In other words, the P processing units may be on one chip. In some other cases, the processor 901 may be implemented by an operation circuit including a plurality of processors, and each processor may include one or more processing units. The plurality of processors jointly form the processor 901 shown in FIG. 9.

It should be understood that FIG. 9 shows only elements related to tensor processing in the data processing apparatus. In addition to the elements shown in FIG. 9, the data processing apparatus may further include elements that are not shown in FIG. 9. For example, the data processing apparatus may further include a transceiver, configured to receive to-be-processed input data. The transceiver may further be configured to send processed data to another apparatus.

For ease of description, FIG. 9 shows only one memory. In an actual product, there may be one or more memories. The memory may also be referred to as a storage medium, a storage device, or the like. The memory may be disposed independent of the processor, or may be integrated with the processor. This is not limited in the embodiments of this application.

The processor 901 and the memory 902 communicate with each other by using an internal connection path to transfer a control and/or data signal.

The methods disclosed in the foregoing embodiments of the present invention may be applied to the processor 901 or may be implemented by the processor 901. The processor 901 has a signal processing capability. In embodiments of an implementation process, steps in the foregoing methods can be implemented by a hardware integrated logical circuit in the processor 901, or by instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions in the memory and completes the steps of the foregoing methods in combination with hardware in the processor.

Optionally, in some embodiments, the memory 902 may store an instruction used to perform the method performed by the data processing apparatus in the method shown in FIG. 1 and/or FIG. 2. The processor 901 may execute the instruction stored in the memory 902, to complete the method shown in FIG. 1 and/or FIG. 2 in combination with other hardware (for example, the memory 902).

For example, the memory 902 is configured to store an input tensor corresponding to input data. The input tensor is an N-dimensional tensor, the input tensor consists of M tensor blocks, N is a positive integer greater than or equal to 1, and M is a positive integer greater than or equal to 2. The processor 901 is configured to process the M tensor blocks concurrently. In a first time period, all of the tensor blocks that are processed concurrently by P processing units are first-type tensor blocks. The first-type tensor block is a tensor block whose tensor block attribute is a first attribute in the M tensor blocks. In a second time period, all of the tensor blocks that are processed concurrently by P processing units are second-type tensor blocks. The second-type tensor block is a tensor block whose tensor block attribute is a second attribute in the M tensor blocks. The first time period does not overlap the second time period, and P is a positive integer greater than or equal to 2.

For a specific working process and beneficial effects of the processor 901, refer to the descriptions in the embodiments shown in FIG. 1 and FIG. 2.

The embodiments of this application impose no limitation on how the processor performs a processing operation other than parallel processing performed by the P processing units on the M tensor blocks. For example, in the embodiments of this application, which processing units in the processor configured to determine $M_1$ first tensor block indexes and $M_2$ second tensor block indexes, organize the $M_1$ first tensor block indexes and the $M_2$ second tensor block indexes, and the like are not limited. These processing units may be the P processing units, or may be some of the P processing units, or may be processing units other than the P processing units in the processor. Operations of determining the $M_1$ first tensor block indexes and the $M_2$ second tensor block indexes are used as an example. It is assumed that Q processing units are configured to determine $M_1$ first-type tensor blocks and $M_2$ second-type tensor blocks.

For example, it is assumed that the processor includes K processing units in total. K is a positive integer greater than or equal to P.

Optionally, in some embodiments, the Q processing units may be some of the K processing units. For example, the processor includes 80 processing units in total: a processing unit 1 to a processing unit 80. The Q processing units include a processing unit 1 to a processing unit 72.

Optionally, in some other embodiments, the Q processing units may be all of the K processing units. For example, the processor includes 80 processing units in total: a processing unit 1 to a processing unit 80. The Q processing units include a processing unit 1 to a processing unit 80.

Optionally, in some embodiments, the P processing units may be some of the K processing units. For example, the processor includes 80 processing units in total: a processing unit 1 to a processing unit 80. The P processing units include a processing unit 1 to a processing unit 72.

Optionally, in some other embodiments, the P processing units may alternatively be all of the K processing units. For example, the processor includes 80 processing units in total: a processing unit 1 to a processing unit 80. The P processing units include a processing unit 1 to a processing unit 80.

Optionally, in some embodiments, the Q processing units may be the same as the P processing units. In other words, a value of P is the same as a value of Q, and the P processing units are the Q processing units. For example, the processor includes 80 processing units in total: a processing unit 1 to a processing unit 80. The Q processing units include a processing unit 1 to a processing unit 72. The P processing units include a processing unit 1 to a processing unit 72.

Optionally, in some other embodiments, the Q processing units may be some of the P processing units. For example, the processor includes 80 processing units in total: a processing unit 1 to a processing unit 80. The Q processing units include a processing unit 1 to a processing unit 50. The P processing units include a processing unit 1 to a processing unit 72.

Optionally, in some other embodiments, the P processing units may be some of the Q processing units. For example, the processor includes 80 processing units in total: a processing unit 1 to a processing unit 80. The Q processing units include a processing unit 1 to a processing unit 72. The P processing units include a processing unit 1 to a processing unit 50.

Optionally, in some other embodiments, an intersection may exist between the P processing units and the Q processing units. For example, the processor includes 80 processing units in total: a processing unit 1 to a processing unit 80. The P processing units include a processing unit 1 to a processing unit 72, and the Q processing units may include a processing unit 58 to a processing unit 80.

Optionally, in some other embodiments, an intersection may not exist between the P processing units and the Q processing units. For example, the processor includes 80 processing units in total: a processing unit 1 to a processing unit 80. The P processing units include a processing unit 1 to a processing unit 50, and the Q processing units may include a processing unit 58 to a processing unit 80.

In addition, as described above, the processor 901 may be one chip (e.g., processor), or may include a plurality of processor chips (e.g., processors). It is further assumed that the processor includes K processing units in total. Optionally, in some embodiments, the K processing units may be located in a same chip. In this case, the P processing units and the Q processing units are also located in a same chip. For example, one data processing apparatus includes 80 processing units in total, and the 80 processing units may be located in a same chip.

Optionally, in some embodiments, the K processing units may be located in different chips. In this case, the P processing units and the Q processing units may be located in a same chip, or may be located in different chips. Alternatively, some of the P processing units and the Q processing units may be located in a same chip.

It is assumed that one data processing apparatus includes 80 processing units in total, and the 80 processing units are a processing unit 1 to a processing unit 80. The data processing unit may include four chips. A chip 1 includes a processing unit 1 to a processing unit 20, a chip 2 includes a processing unit 21 to a processing unit 40, a chip 3 includes a processing unit 41 to a processing unit 60, and a chip 4 includes a processing unit 61 to a processing unit 80.

In some embodiments, the P processing units may be a processing unit 1 to a processing unit 20, and the Q processing units may be a processing unit 21 to a processing unit 40. It can be learned that the chip 1 includes the P processing units, and the chip 2 includes the Q processing units. The P processing units and the Q processing units are located in different chips.

In some embodiments, the P processing units may be a processing unit 1 to a processing unit 40, and the Q processing units may be a processing unit 41 to a processing unit 80. It can be learned that the chip 1 and the chip 2 include the P processing units, and the chip 3 and the chip 4 include the Q processing units. The P processing units and the Q processing units are located in different chips, the P processing units include processing units included in two chips, and the Q processing units also include processing units included in two chips.

In some embodiments, the P processing units may be a processing unit 1 to a processing unit 10, and the Q processing units may be a processing unit 11 to a processing unit 20. It can be learned that the chip 1 includes the P processing units and the Q processing units. The P processing units and the Q processing units are located in a same chip.

In some embodiments, the P processing units may be a processing unit 1 to a processing unit 30, and the Q processing units may be a processing unit 31 to a processing unit 60. It can be learned that the chip 1 and the chip 2 include the P processing units, and the chip 2 and the chip 3 include the Q processing units. In other words, some of the P processing units and some of the Q processing units are located in a same processing unit, and the other of the P processing units and the other of the Q processing units are located in different processing units.

In some embodiments, the P processing units may be a processing unit 1 to a processing unit 30, and the Q processing units may be a processing unit 21 to a processing unit 40. It can be learned that the chip 1 and the chip 2 include the P processing units, and the chip 2 and the chip 3 include the Q processing units. In other words, some of the P processing units and some of the Q processing units are located in a same processing unit, the other of the P processing units and the other of the Q processing units are located in different processing units, and the some of the P processing units are the same as the some of the Q processing units. An embodiment of this application further provides a computer-readable storage medium. The computer-readable storage medium stores an instruction. When the instruction is executed, the method in the foregoing method embodiment is performed.

Figure 10:
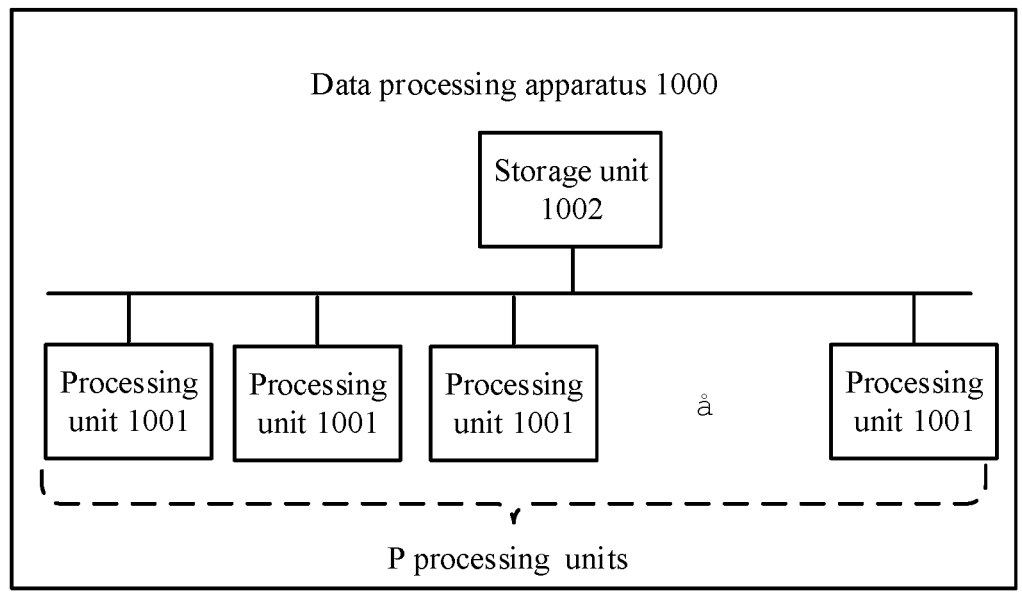
FIG. 10 is a structural block diagram of a data processing apparatus according to an embodiment of this application.

FIG. 10 is a structural block diagram of a data processing apparatus according to an embodiment of this application. As shown in FIG. 10, the data processing apparatus 1000 includes P processing units 1001 and a storage unit 1002. The data processing apparatus shown in FIG. 10 may perform the steps performed by the data processing apparatus in the embodiment shown in FIG. 1 or FIG. 2. For example, the storage unit 1002 may be configured to store an input tensor corresponding to input data. The input tensor is an N-dimensional tensor, the input tensor consists of M tensor blocks, N is a positive integer greater than or equal to 1, and M is a positive integer greater than or equal to 2. The P processing units may be configured to process the M tensor blocks concurrently. In a first time period, all of the tensor blocks that are processed concurrently by P processing units are first-type tensor blocks. The first-type tensor block is a tensor block whose tensor block attribute is a first attribute in the M tensor blocks. In a second time period, all of the tensor blocks that are processed concurrently by P processing units are second-type tensor blocks. The second-type tensor block is a tensor block whose tensor block attribute is a second attribute in the M tensor blocks. The first time period does not overlap the second time period, and P is a positive integer greater than or equal to 2.

Optionally, in some embodiments, the data processing apparatus 1000 may further include a scheduling unit (not shown in the figure). The scheduling unit may be configured to determine $M_1$ first-type tensor blocks and $M_2$ second-type tensor blocks. The scheduling unit may further be configured to organize the $M_1$ first tensor block indexes and the $M_2$ second tensor block indexes. The scheduling unit may further be configured to determine a first correspondence and a second correspondence. The first correspondence is a correspondence between the P processing units and the first-type tensor blocks. The second correspondence is a correspondence between the P processing units and the second-type tensor blocks.

The scheduling unit and the processing unit may be implemented by a processor, and the storage unit may be implemented by a memory. For specific functions and beneficial effects of the scheduling unit, the storage unit, and the processing unit, refer to the embodiment shown in FIG. 1 or FIG. 2. Details are not described herein again.

An embodiment of this application further provides a computer program product including an instruction. When the instruction is executed, the method in the foregoing method embodiment is performed.

A person of ordinary skill in the art may be aware that units and algorithm steps in the examples described with reference to the embodiments disclosed in this specification may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code such as a universal serial bus (USB) flash drive, a removable hard disk, a read-only memory (ROM), a random access memory (RAM), a magnetic disk, or an optical disc.

The foregoing descriptions are merely specific embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
obtaining an input tensor corresponding to input data, wherein the input tensor is an N-dimensional tensor, N is a positive integer greater than or equal to 1, the input tensor consists of M tensor blocks, and M is a positive integer greater than or equal to 2; and
processing, by a computer processing system comprising P processing units, subsets of the M tensor blocks concurrently, the subsets of the M tensor blocks comprising: a first subset of tensor blocks that are first-type tensor blocks each having a first attribute in the M tensor blocks, and a second subset of tensor blocks that are second-type tensor blocks each having a second attribute in the M tensor blocks, wherein P is a positive integer greater than or equal to 2, the processing comprising:
processing, in a first time period by the P processing units in parallel, all tensor blocks in the first subset of tensor blocks,
processing, in a second time period by the P processing units in parallel, all tensor blocks in the second subset of tensor blocks, and
the first time period does not overlap the second time period.

2. The method according to claim 1, wherein before the processing the subsets of the M tensor blocks concurrently, the method further comprises:
determining $M_1$ first tensor block indexes and $M_2$ second tensor block indexes, wherein the $M_1$ first tensor block indexes respectively indicate $M_1$ first-type tensor blocks, the $M_2$ second tensor block indexes respectively indicate $M_2$ second-type tensor blocks, and $M_1$ and $M_2$ are positive integers greater than or equal to 1;
saving the $M_1$ first tensor block indexes in a first storage space, and saving the $M_2$ second tensor block indexes in a second storage space; and
obtaining the $M_1$ first tensor block indexes from the first storage space, and obtaining the $M_2$ second tensor block indexes from the second storage space; and the processing, the M tensor blocks concurrently further comprises:
processing, by the P processing units, the M tensor blocks concurrently based on the $M_1$ first tensor block indexes and the $M_2$ second tensor block indexes, wherein the $M_1$ first-type tensor blocks that are processed concurrently by the P processing units in the first time period are determined from the M tensor blocks based on the $M_1$ first tensor block indexes, and the $M_2$ second-type tensor blocks that are processed concurrently by the P processing units in the second time period are determined from the M tensor blocks based on the $M_2$ second tensor block indexes.

3. The method according to claim 2, wherein the $M_1$ first tensor block indexes are stored in the first storage space in a consecutive manner, and the $M_2$ second tensor block indexes are stored in the second storage space in a consecutive manner.

4. The method according to claim 2, wherein a sequence of each of the $M_1$ first tensor block indexes in the first storage space is the same as a sequence of first-type tensor blocks indicated by the first tensor block index in the M tensor blocks; and
a sequence of each of the $M_2$ second tensor block indexes in the second storage space is the same as a sequence of second-type tensor blocks indicated by the second tensor block index in the M tensor blocks.

5. The method according to claim 1, wherein before processing, by the P processing units in the computer processing system, the subsets of the M tensor blocks concurrently, the method further comprises:
determining a first correspondence between the P processing units and the first-type tensor blocks;
determining a second correspondence between the P processing units and the second-type tensor blocks; and
the processing, the M tensor blocks concurrently comprises:
processing, by the P processing units, the M tensor blocks concurrently based on the first correspondence and the second correspondence.

6. The method according to claim 2, wherein the method further comprises:
determining tensor block attribute indication information comprising M pieces of indication information that respectively indicate tensor block attributes of the M tensor blocks; and
determining M tensor block indexes that respectively indicate the M tensor blocks; and
the determining $M_1$ first tensor block indexes and $M_2$ second tensor block indexes comprises:
determining the $M_1$ first tensor block indexes and the $M_2$ second tensor block indexes from the M tensor block indexes based on the M pieces of indication information.

7. The method according to claim 6, wherein the determining the $M_1$ first tensor block indexes and the $M_2$ second tensor block indexes from the M tensor block indexes based on the M pieces of indication information comprises:
determining first location information based on the M pieces of indication information, wherein the first location information indicates a location of each piece of first indication information in the M pieces of indication information in $M_1$ pieces of first indication information, and the tensor block attribute indicated by the $M_1$ pieces of first indication information is the first attribute;
determining second location information based on the M pieces of indication information, wherein the second location information indicates a location of each piece of second indication information in the M pieces of indication information in the $M_2$ pieces of second indication information, and the tensor block attribute indicated by the $M_2$ pieces of second indication information is the second attribute;
determining the $M_1$ first tensor block indexes based on the first location information; and
determining the $M_2$ second tensor block indexes based on the second location information.

8. An apparatus, comprising:
a processor comprising P processing units, wherein P is a positive integer greater than or equal to 2; and
a memory, which is configured to store an input tensor corresponding to input data, wherein the input tensor is an N-dimensional tensor, the input tensor consists of M tensor blocks, N is a positive integer greater than or equal to 1, and M is a positive integer greater than or equal to 2, the memory coupled to the processor and configured to store a plurality of instructions that, when executed by the processor, causes the processor to:
process subsets of the M tensor blocks concurrently by:
processing, in a first time period by the P processing units in parallel, all tensor blocks in a first subset of tensor blocks that are first-type tensor blocks each having a first attribute in the M tensor blocks, processing, in a second time period by the P processing units in parallel, all tensor blocks in a second subset of tensor blocks that are second-type tensor blocks each having a second attribute in the M tensor blocks, and the first time period does not overlap the second time period.

9. The apparatus according to claim 8, wherein the processor is further configured to determine $M_1$ first tensor block indexes and $M_2$ second tensor block indexes, wherein the $M_1$ first tensor block indexes respectively indicate $M_1$ first-type tensor blocks, the $M_2$ second tensor block indexes respectively indicate $M_2$ second-type tensor blocks, and $M_1$ and $M_2$ are positive integers greater than or equal to 1;

the memory is further configured to save the $M_1$ first tensor block indexes and the $M_2$ second tensor block indexes, wherein the $M_1$ tensor block indexes are saved in a first storage space of the memory, and the $M_2$ second tensor block indexes are saved in a second storage space of the memory; and the P processing units are further configured to: obtain the $M_1$ first tensor block indexes from the first storage space, obtain the $M_2$ second tensor block indexes from the second storage space, and process the M tensor blocks concurrently based on the $M_1$ first tensor block indexes and the $M_2$ second tensor block indexes, wherein the $M_1$ first-type tensor blocks that are processed concurrently by the P processing units in the first time period are determined from the M tensor blocks based on the $M_1$ first tensor block indexes, and the $M_2$ second-type tensor blocks that are processed concurrently by the P processing units in the second time period are determined from the M tensor blocks based on the $M_2$ second tensor block indexes.

10. The apparatus according to claim 9, wherein the $M_1$ first tensor block indexes are stored in the first storage space in a consecutive manner, and the $M_2$ second tensor block indexes are stored in the second storage space in a consecutive manner.

11. The data processing apparatus according to claim 9, wherein a sequence of each of the $M_1$ first tensor block indexes in the first storage space is the same as a sequence of first-type tensor blocks indicated by the first tensor block index in the M tensor blocks; and a sequence of each of the $M_2$ second tensor block indexes in the second storage space is the same as a sequence of second-type tensor blocks indicated by the second tensor block index in the M tensor blocks.

12. The data processing apparatus according to claim 8, wherein the processor is further configured to determine a first correspondence and a second correspondence, wherein the first correspondence is a correspondence between the P processing units and the first-type tensor blocks, and the second correspondence is a correspondence between the P processing units and the second-type tensor blocks; and the P processing units are further configured to process the M tensor blocks concurrently based on the first correspondence and the second correspondence.

13. The data processing apparatus according to claim 9, wherein the processor is further configured to:

determine tensor block attribute indication information comprising M pieces of indication information that respectively indicate tensor block attributes of the M tensor blocks;

determine M tensor block indexes that respectively indicate the M tensor blocks; and determine the $M_1$ first tensor block indexes and the $M_2$ second tensor block indexes from the M tensor block indexes based on the M pieces of indication information.

14. The data processing apparatus according to claim 13, wherein the processor is further configured to:

determine first location information based on the M pieces of indication information, wherein the first location information indicates a location of each piece of first indication information in the M pieces of indication information in the $M_1$ pieces of first indication information, and the tensor block attribute indicated by the $M_1$ pieces of first indication information is the first attribute;

determine second location information based on the M pieces of indication information, wherein the second location information indicates a location of each piece of second indication information in the M pieces of indication information in the $M_2$ pieces of second indication information, and the tensor block attribute indicated by the $M_2$ pieces of second indication information is the second attribute;

determine the $M_1$ first tensor block indexes based on the first location information; and determine the $M_2$ second tensor block indexes based on the second location information.

15. A non-transitory computer-readable storage medium storing a program, wherein the program comprises instructions, and when the instructions are executed by a terminal, cause the terminal to perform a data processing method, comprising:

obtaining an input tensor corresponding to input data, wherein the input tensor is an N-dimensional tensor, N is a positive integer greater than or equal to 1, the input tensor consists of M tensor blocks, and M is a positive integer greater than or equal to 2; and processing, by P processing units of a processing system of the terminal, subsets of the M tensor blocks concurrently, the subsets of the M tensor blocks comprising: a first subset of tensor blocks that are first-type tensor blocks each having a first attribute in the M tensor blocks, and a second subset of tensor blocks that are second-type tensor blocks each having a second attribute in the M tensor blocks, wherein P is a positive integer greater than or equal to 2, the processing comprising:

processing, in a first time period by the P processing units in parallel, all tensor blocks in the first subset of tensor blocks, processing, in a second time period by the P processing units in parallel, all tensor blocks in the second subset of tensor blocks, and the first time period does not overlap the second time period.

16. The computer readable storage medium according to claim 15, wherein the method further comprises:

determining $M_1$ first tensor block indexes and $M_2$ second tensor block indexes, wherein the $M_1$ first tensor block indexes respectively indicate $M_1$ first-type tensor blocks, the $M_2$ second tensor block indexes respectively indicate $M_2$ second-type tensor blocks, and $M_1$ and $M_2$ are positive integers greater than or equal to 1;

saving the $M_1$ first tensor block indexes in a first storage space, and saving the $M_2$ second tensor block indexes in a second storage space; and obtaining the $M_1$ first tensor block indexes from the first storage space, and obtaining the $M_2$ second tensor block indexes from the second storage space; and the processing, the M tensor blocks concurrently further comprises:

processing, by the P processing units, the M tensor blocks concurrently based on the $M_1$ first tensor block indexes and the $M_2$ second tensor block indexes, wherein the $M_1$ first-type tensor blocks that are processed concurrently by the P processing units in the first time period are determined from the M tensor blocks based on the $M_1$ first tensor block indexes, and the $M_2$ second-type tensor blocks that are processed concurrently by the P processing units in the second time period are determined from the M tensor blocks based on the $M_2$ second tensor block indexes.

17. The computer readable storage medium according to claim 16, wherein the $M_1$ first tensor block indexes are stored in the first storage space in a consecutive manner, and the $M_2$ second tensor block indexes are stored in the second storage space in a consecutive manner.

18. The computer readable storage medium according to claim 16, wherein a sequence of each of the $M_1$ first tensor block indexes in the first storage space is the same as a sequence of first-type tensor blocks indicated by the first tensor block index in the M tensor blocks; and a sequence of each of the $M_2$ second tensor block indexes in the second storage space is the same as a sequence of second-type tensor blocks indicated by the second tensor block index in the M tensor blocks.

19. The computer readable storage medium according to claim 15, wherein the method further comprises:

determining a first correspondence between the P processing units and the first-type tensor blocks;

determining a second correspondence between the P processing units and the second-type tensor blocks; and the processing, the M tensor blocks concurrently comprises:

processing, by the P processing units, the M tensor blocks concurrently based on the first correspondence and the second correspondence.

20. The computer readable storage medium according to claim 16, wherein the method further comprises:

determining tensor block attribute indication information comprising M pieces of indication information that respectively indicate tensor block attributes of the M tensor blocks; and determining M tensor block indexes that respectively indicate the M tensor blocks; and the determining $M_1$ first tensor block indexes and $M_2$ second tensor block indexes comprises:

determining the $M_1$ first tensor block indexes and the $M_2$ second tensor block indexes from the M tensor block indexes based on the M pieces of indication information.

* * * * *